United States Patent [19]

Maeda

[11] 4,222,608
[45] Sep. 16, 1980

[54] CONTROL SYSTEM FOR ADJUSTABLE HEAD RESTRAINT ON AUTOMOTIVE SEAT

[75] Inventor: Kouzo Maeda, Yokohama, Japan

[73] Assignee: Nissan Motor Company, Limited, Tokahana, Japan

[21] Appl. No.: 951,631

[22] Filed: Oct. 16, 1978

[30] Foreign Application Priority Data

Dec. 30, 1977 [JP] Japan ................................. 52-178391

[51] Int. Cl.² .............................................. A47C 1/10
[52] U.S. Cl. .................................. 297/410; 297/391
[58] Field of Search ................. 280/753; 297/61, 112, 297/114, 410

[56] References Cited

U.S. PATENT DOCUMENTS 3,171,689  3/1965  Chessbown ......................... 297/391
4,082,354  4/1978  Renner et al. ....................... 297/410

Primary Examiner—James C. Mitchell

[57] ABSTRACT

In a control system for a head restraint adjustably mounted on an automotive seat with the provision of a load-sensitive switch in the seat and a reversible motor responsive to the action of the switch, a switching circuit comprises a device having a pair of conductors fixed to a rotatable member coupled with the reversible motor and a set of stationary contacts arranged to individually make sliding contact with at least one of the conductors. The position of the stationary contacts is adjustable, and the head restraint is automatically lifted upon occupation of the seat by a passenger to a position determined by the position of this contact. The control system includes a selector switch to enable manual control of the action of the motor so as to move the head restraint from the automatically lifted position.

7 Claims, 15 Drawing Figures

CONTROL SYSTEM FOR ADJUSTABLE HEAD RESTRAINT ON AUTOMOTIVE SEAT

BACKGROUND OF THE INVENTION

This invention relates to a control system for a head restraint adjustably mounted on an automotive seat with the provision of a load-sensitive switch in the seat and a reversible motor responsive to the action of the load-sensitive switch.

The provision of a head restraint on the seat back of an automotive seat is effective for protecting the passenger in the seat against a whiplash injury in case of a rear-end collision of the car. A primitive head restraint is mounted on the seat back so as to rest in a fixed position. When an automotive seat provided with this type of head restraint is left unoccupied while an adjacent seat is occupied by a driver, the head restraint on the unoccupied seat offers considerably and unnecessary obstruction to the side and rear visibility of the driver. If a passenger is seated in a seat behind the unoccupied seat the front visibility of this passenger is greatly and unnecessarily obstructed by the head restraint on the unoccupied seat.

An automatic head restraint adjustment system has been developed to resolve inconveniences of the fixed head restraint. In this case a head restraint is supported by pillars which can be moved in the seat back selectively upwards and downwards by means of a reversible motor and a link mechanism. A control circuit for the control of the operation of the motor includes a load-sensitive switch installed in the seat cushion. The head restraint rests in its lowest position, i.e. on the top of the seat back while the seat is unoccupied. Upon occupation of the seat by a passenger, the head restraint is automatically lifted to take a predetermined position. This position is the highest position the head restraint can take. The adjustment system includes a manually operated selector switch which allows the passenger in the seat to lower and the head restraint from the highest position to an intermediate position suited to the sitting height of the passenger. Irrespective of the ultimately adjusted position, the head restraint is automatically returned to its lowest position in response to withdrawal of the passenger from the seat.

In this system the highest position of the head restraint, i.e. the position preset as the terminal point of the automatic ascent, must be high enough to afford effective protection even to very tall passengers. Accordingly most of the car users need to manually lower the head restraint after completion of its automatic ascent. This means a considerable reduction of the merit of the automatic head restraint adjustment system. To most users this system does not appreciably differ from a more simple system, a manual head restraint adjustment system. The necessity of manual readjustment for most users will be lessened by the employment of a relatively low position as the terminal point of the automatic ascent of the head restraint, i.e. the highest position the head restraint can take. However, such a way of design will result in that the head restraint does not afford sufficient safety to passengers of more than average sitting height.

SUMMARY OF THE INVENTION

It is an object of the present invention to provide an improved control system for a head restraint adjustably mounted on an automotive seat, which system minimizes the necessity of manually readjusting the automatically lifted head restraint in accordance with sitting height of individual seat occupants and, nevertheless, allows the head restraint to take a position high enough to afford sufficient safety even to a very tall passenger.

A system according to the invention includes support members which support thereon the head restraint and are movable upwards and downwards, a reversible motor, means for transforming rotation of the reversible motor into a linear motion of a rigid bar, means for transmitting a linear motion of the rigid bar to the support members, a load-sensitive switch attached to the seat and a switching circuit for controlling the action of the reversible motor such that the head restraint is lifted from its lowest position in response to the occupation of the seat by a passenger detected by the load-sensitive switch and is lowered in response to the withdrawal of the passenger from the seat. The switching circuit includes a manually operated selector switch to enable manual control of the action of the reversible motor so as to move the head restraint from the automatically lifted position while the seat is occupied by a passenger. As the feature of the system according to the invention, the switching circuit further comprises a control device to control the action of the reversible motor such that the head restraint is automatically lifted to an optionally predetermined position in response to the occupation of the seat by a passenger. This control device comprises a rotatable member of an electrically insulating material coupled with the reversible motor, a pair of conductors fixed to the rotatable member and a set of stationary contacts arranged to individually make sliding contact with at least one of the conductors. The stationary contacts include a fixed first contact whose angular position with respect to the axis of the rotation of the rotatable member determines the lowest position of the head restraint, a fixed second contact whose angular position with respect to the aforementioned axis determines the highest position the head restraint can take and a third contact whose angular position with respect to the aforementioned axis and the first and second contacts is adjustable from the outside of the device and determines the aforementioned predetermined position of the head restraint.

As a preferred example, the control device has a toothed wheel coupled with the reversible motor and the aforementioned rotatable member takes the form of a disc placed concentrically on one side of the wheel. Preferably, one of the conductors in this device is a generally annular first plate which is placed concentrically on the outer side of the disc and has a radial projection, while the other conductor is a generally annular second plate which has an inner diameter larger than the outer diameter of the first annular plate and is placed concentrically on the outer side of the disc. The second annular plate has a radial indentation on the inner periphery thereof such that the projection of the first plate is received in this indentation without contacting the second plate. In this case the aforementioned stationary contacts consist of the above described three contacts, a fixed fourth contact which is connected to a positive terminal of the circuit and is positioned so as to always in contact with the first plate and a fixed fifth contact which is grounded and is positioned so as to be always in contact with the second plate. These five contacts are arranged circumferentially substantially in a plane parallel to the two conductor plates such that the projection of the first conductor plate comes into contact with the first, second and third contacts in turn when the toothed wheel is rotated.

When the selector switch is manipulated, the third contact in the control device is disconnected from the switching circuit so that the head restraint can be lifted or lowered from the automatically lifted position.

DESCRIPTION OF THE PREFERRED EMBODIMENTS

Figure 1:
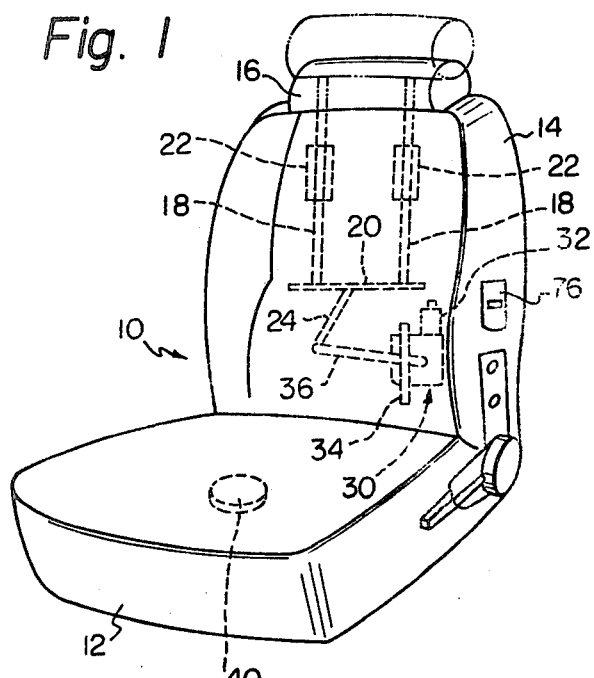
FIG. 1 is a perspective view of an automotive seat assembly including a head restraint adjustment system according to the invention.
Figure 2:
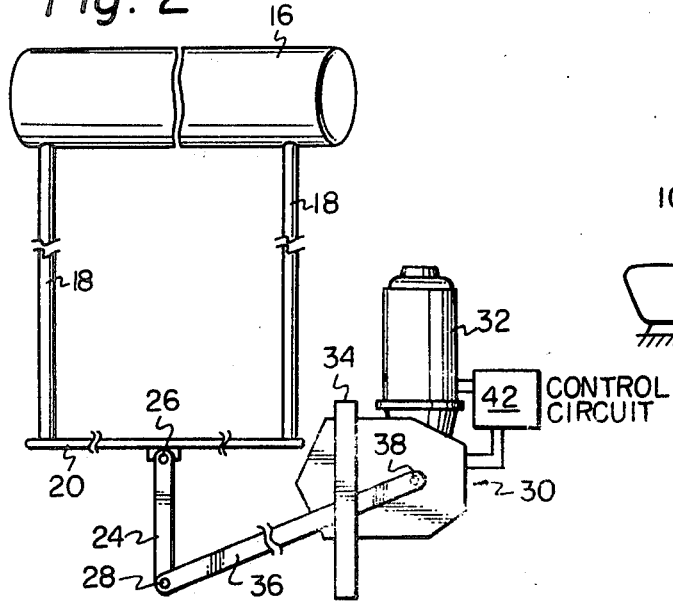
FIG. 2 shows diagrammatically the outline of the head restraint adjustment system in the seat assembly of FIG. 1.

Referring to FIGS. 1 and 2, an automotive seat assembly 10 to which the invention is applied includes a seat cushion 12, a seat back 14 and a head restraint 16 resting on the top of the seat back 14. The seat back 14 is not so tall that the head restraint 16 in this position is too low for most passengers expected to sit in this seat 10. In the seat back 14, a pair of parallel pillars 18 extending downwards from the head restraint 16 are held slidably by brackets 22 which are fixed to a back frame (not shown) of the seat back 14. A cross bar 20 is fixed to the pillars 18 at, or close to, their lower ends so that the two pillars 18 can be moved together. Installed in the seat back 14 is a driving mechanism 30 which includes a reversible motor 32 and produces a reciprocating motion of an elongate slider member 34. Coupled with the slider 34 in the manner described hereinafter, a connecting rod 36 is pivotally mounted at its one end on a fixed axle 38 of the driving mechanism 30. A link 24 is pivoted at its one end to the cross bar 20 by means of a loose joint such as a pin 26 and at the other end to the free end of the connecting rod by a suitable joint means such as a pin 28. Disposed in the seat cushion 12 is a seat switch (a load-sensitive switch) 40 to actuate the driving mechanism 30 so as to thrust up the pillars 18 and hence the head restraint 16 upon occupation of the seat 10 by a passenger. When the passenger leaves the seat 10 the driving mechanism 30 is again actuated by the action of the seat switch 40 so as to lower the pillars 18 and hence the head restraint 16.

Figure 3:
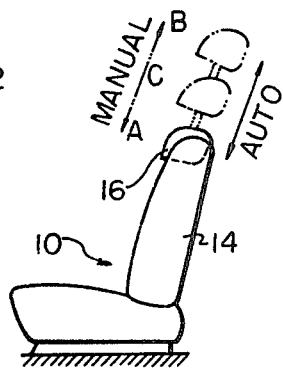
FIG. 3 is a side elevational sketch of an automotive seat assembly including an adjustable head restraint for the explanation of the manner of adjusting the vertical position of the head restraint by a conventional technique.

This type of head restraint adjustment system is a known one. In the case of a conventional system, the operation of the reciprocatory driving mechanism 30 is such that, upon occupation of the seat 10 by a passenger, the head restraint 16 is automatically lifted from its lowest position indicated at A in FIG. 3 to the highest position B. If desired, the seat occupant can make switchover of the driving mechanism 30 from automatic operation mode to manual operation mode and can lower the head restraint 16 from the highest position B to an intermediate position C chosen arbitrarily and suited for the sitting height of the seat occupant. After completion of the manual adjustment, the head restraint 16 remains in the position C so long as the seat 10 is occupied. When the passenger leaves the seat 10, the driving mechanism 30 is actuated by the action of the seat switch 40 so as to cause automatic descent of the head restraint 16 to the lowest position A. This manner of head restraint adjustment is still unsatisfactory as mentioned hereinbefore.

Figure 4:
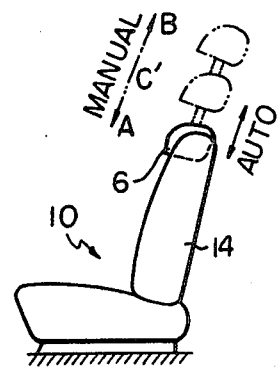
FIG. 4 is a side elevational sketch of a similar automotive seat assembly for the explanation of the function of a head restraint adjustment system according to the invention.
Figure 5:
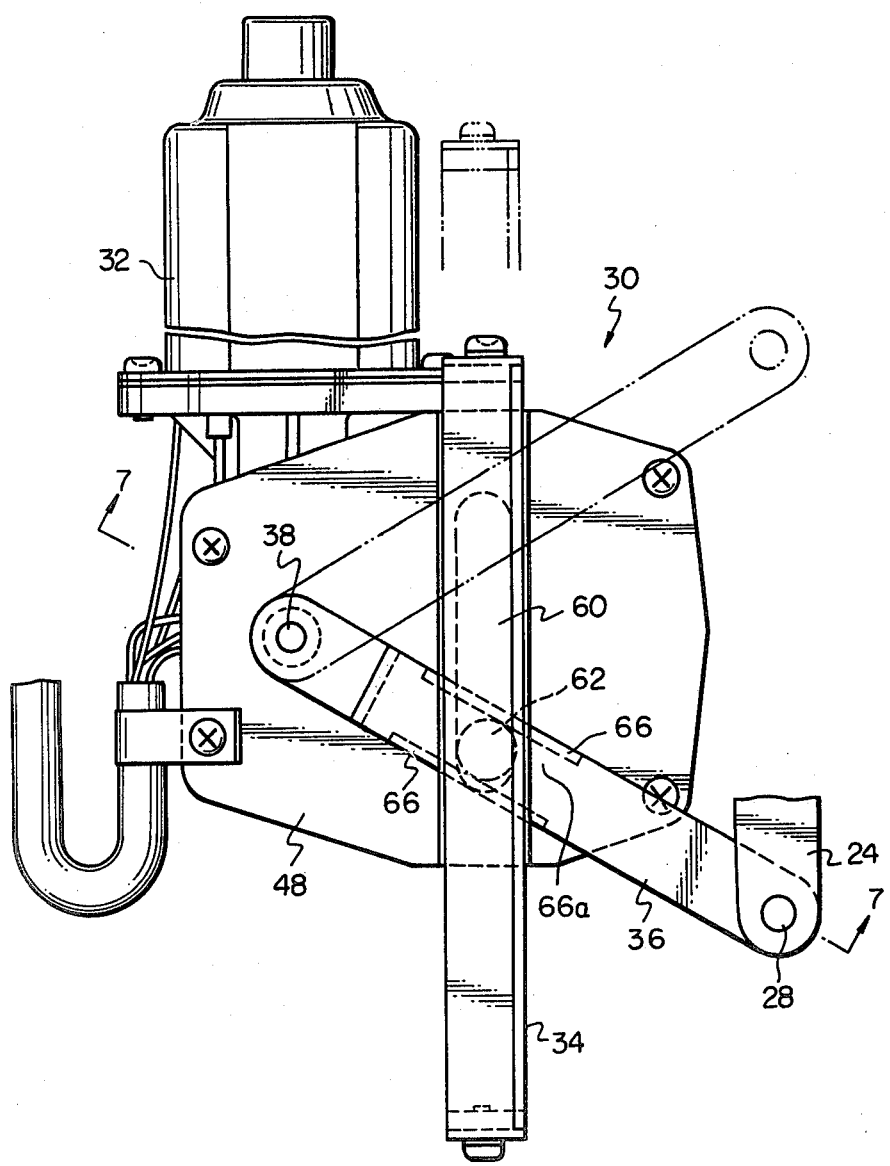
FIG. 5 is a plan view of a driving mechanism as part of the system of FIG. 2.
Figure 6:
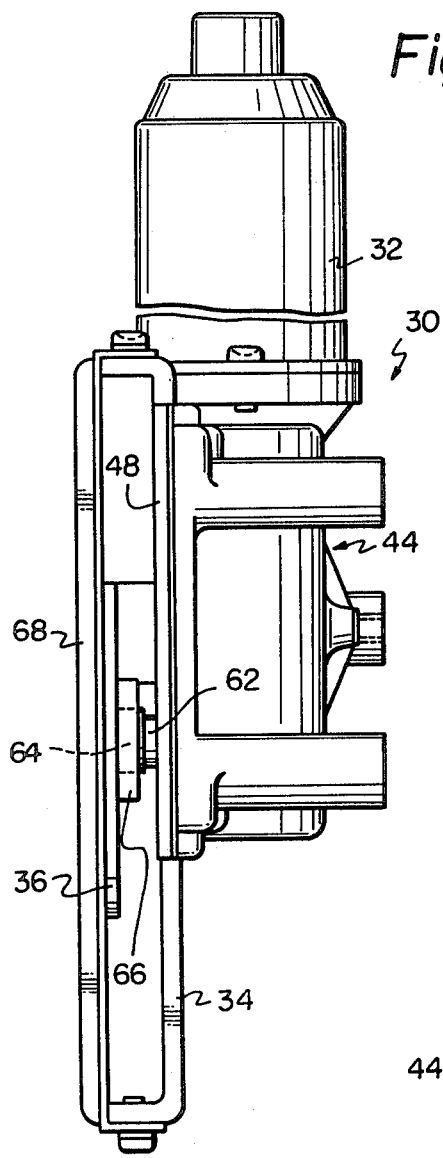
FIG. 6 is a side elevation of the same driving mechanism.

According to the invention, the driving mechanism 30 functions such that an automatic ascent of the head restraint 16 in response to sitting of a passenger in the seat 10 stops, as shown in FIG. 4, upon arrival of the head restraint 16 at a position C' arbitrarily chosen in advance. This position C' may be any position between the lowest and highest positions A and B. Also it is possible to bring the head restraint 16 to any position between the lowest and highest positions A and B by manual manipulation of the driving mechanism 30. When the position C' is preset by the manufacturer in accordance with an estimated average sitting height of expected car users, there will be no need for most users to manually adjust the vertical position of the head restraint 16 after automatic ascent of the head restraint 16 to the preset position C'. Of course, the presetting of the position C' may be left to each car user. When the seat 10 is assigned to a specific person the position C' may be preset in accordance with the sitting height of this person. Then this person is utterly free from troubling to manually adjust the position of the head restraint 16.

Figure 7:
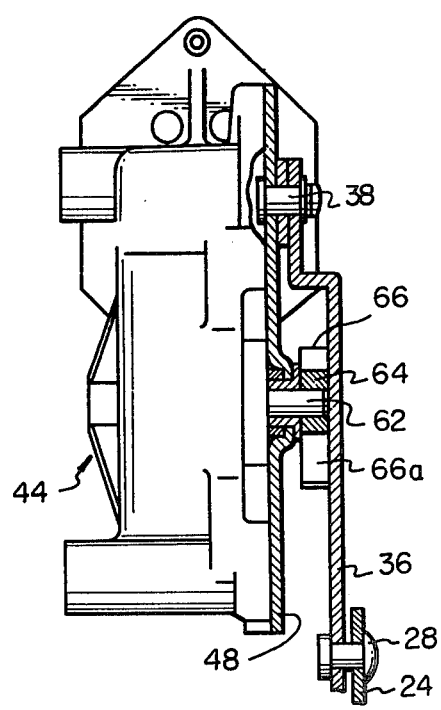
FIG. 7 is a side view, partly in section, taken along the line 7—7 in FIG. 5.
Figure 8:
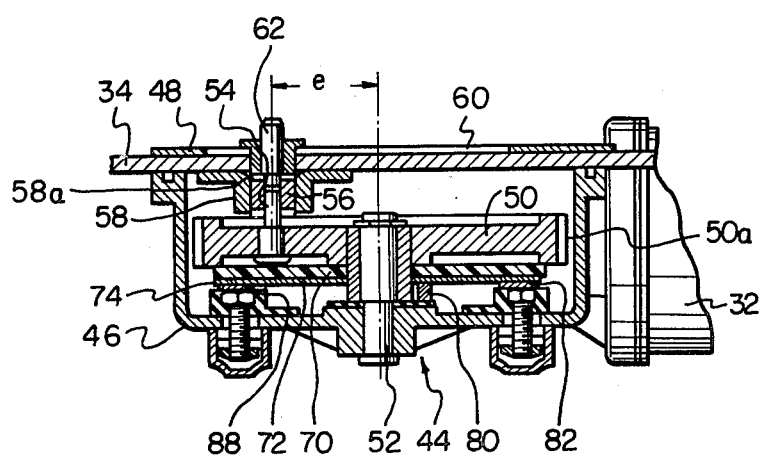
FIG. 8 is an elevational sectional view of a gear-contact assembly as part of the driving mechanism of FIG. 5.

Referring to FIGS. 2 and 5–8, the driving mechanism 30 comprises a gear-contact assembly 44 and a control circuit 42 in association with the reversible motor 32. As shown in FIG. 8, the gear-contact assembly 44 has a box-like housing 46 provided with a center axle 52 protruding from the bottom into the interior. In this housing 46 a worm wheel 50, i.e. a wheel with a toothed rim 50a, is rotatively mounted on the center axle 52 so as to mesh into a toothed shaft (not shown) of the motor 32 thereby to constitute a set of worm gears. A pin 54 is embedded in the worm wheel 50 at a radial distance or eccentricity e from the center axle 52 so as to project parallel to the center axle 52 from the surface of the wheel 50, and a ring-roller 56 is mounted on this pin 54. A cover plate 48 is fixed to the housing 46, and an intermediate portion of the aforementioned elongate slider 34 is slidably received in an inside groove (not shown) of the cover plate 48 so as to extend parallel to the worm wheel 50 at a distance therebetween. The longitudinal axis of the slider 34 intersects the center axis of the worm wheel 50, i.e. the axis of the center axle 52. In a middle region of the slider 34, an elongate guide member 58 is fixed crosswise to the inner surface (that faces the worm wheel 50) of the slider 34 to provide a channel 58a which is cross-sectionally rectangular and longitudinally extends crosswise of the slider 34. The width and depth of the channel 58a are such that the ring roller 56 is rollably and slidably received in this channel 58a and can make a rolling-and-sliding movement in this channel 58a. When the worm wheel 50 is rotated the pin 54 makes a rotational movement relative to the cover plate 48, but nevertheless the roller 56 on the pin 54 is forced to move within the linear channel 58a. The slider 34, therefore, is forced to make a linear movement relative to the cover plate 48 up to the extent of 2e. Thus a rotational movement of the worm wheel 50 or the aforementioned toothed shaft of the motor 32 is transformed into a linear movement of the slider 34. Since the motor 32 can be rotated either clockwise or anticlockwise, the slider 34 can be moved in either of its axial directions.

An elongate slot 60 is formed in the grooved region of the cover plate 48 so as to extend axially of the slider 34. A pin 62 is embedded in the slider 34 at the intersection of its longitudinal axis and the longitudinal axis of the guide member 58 so as to project from the outer surface (on the opposite side with respect to the guide member 58), and a ring-roller 64 is mounted on this pin 62. The connecting rod 36 takes the form of an elongate plate and is pivoted to the cover plate 48 by means of the fixed axle 38 so as to extend parallel to the cover plate 48 at a distance therebetween as shown in FIG. 7. Guide members 66 fixed to the connecting rod 36 (alternatively the guide members 66 may be given by shaping the connecting rod 36) provides a linear guide channel 66a extending longitudinally of the connecting rod 36 on the inner surface of the connecting rod 36. The pin 62 projects through the slot 60 of the cover plate 48 such that the roller 64 is rollably and slidably received in the channel 66a. A retainer bar 68 is fixed to the slider 34 from the outside to prevent detachment of the slider 34 from the cover plate 48.

In regard to the worm wheel 50, housing 46 provided with cover plate 48, slider 34, pin 54 and the guide member 58, the illustrated driving mechanism for transformation of a rotary movement into a reciprocating linear movement is a known technique as disclosed in Japanese Utility Model Application, Publication No. 51(1976)-49269.

Figure 9:
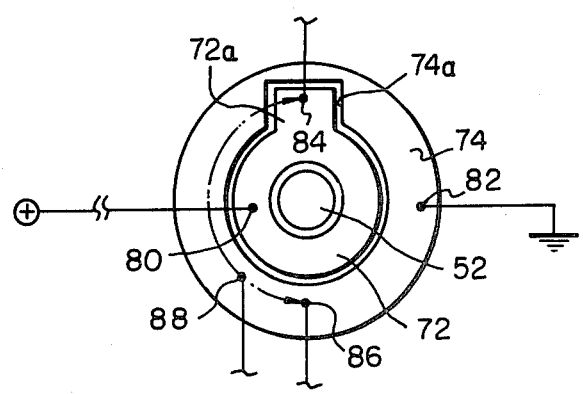
FIG. 9 shows diagrammatically the configuration of two contact plates, together with arrangement of five contacts provided thereto, in the gear-contact assembly of FIG. 8.

As shown in FIG. 8, a disc 70 made of an electrically non-conductive material, hereinafter referred to as contact base, is fixed to the inner surface of the worm wheel 50 so as to rotate about the center axle 52 together with the wheel 50. A generally annular conductor or contact plate 72 is fixed concentrically to the outer surface of the contact base 70 so as to be spaced from the center axle 52, and another conductor or contact plate 74, which is also generally annular but larger in diameters than the former contact plate 72, is concentrically fixed to the same surface of the contact base 70. These two contact plates 72 and 74 have the same thickness, and the inner diameter of the second contact plate 74 is slightly larger than the outer diameter of the first contact plate 72. Referring to FIG. 9, the first contact plate 72 has a radial projection 72a and the second contact plate 74 has a radial notch or indentation 74a on its inner periphery such that the projection 72a of the first contact 72 is received in the indentation 74a without contacting the second contact plate 74. Accordingly the first and second contact plates 72 and 74 are electrically isolated from each other.

In a space between the bottom of the housing 46 and the contact plates 72, 74, five contacts 80, 82, 84, 86 and 88 are arranged in a plane parallel to the contact plates 72, 74 such that each of these contacts 80, 82, 84, 86 and 88 is in contact with one of the two contact plates 72 and 74. In other words, when the worm wheel 50 is rotated the contact plates 72 and 74 slide on these contacts 80, 82, 84, 86 and 88. The first contact 80 is arranged so as to always contact the first contact plate 72 thereby to connect this contact plate 72 to the positive terminal of a DC power supply (not shown) for the reversible motor 32. The second contact 82 is grounded and arranged so as to always contact the sound contact plate 74. The third contact 84 is arranged so as to contact either the second contact plate 74 or the projection 72a of the first contact plate 72 depending on the angular position of the projection 72a with respect to the center axle 52. The position of this contact 84 determines the lowest position A of the head restraint 16. The angular position of this contact 84 with respect to the center axle 52 is such that the projection 72a of the first contact plate 72 rests on this contact 84 when the head restraint 16 takes the lowest position A. The fourth contact 86 is positioned at an angular distance of nearly 180° from the third contact 84 and arranged so as to contact either the second contact plate 74 or the projection 72a of the first contact plate 72. The position of this contact 86 determines the highest position B of the head restraint 16. The fifth contact 88 is positioned between the third and fourth contacts 84 and 86 so as to contact either the second contact plate 74 or the projection 72a of the first contact plate 72. The position of this contact 88 determines the position C' at which the automatic ascent of the head restraint 16 stops. The fifth contact 88, therefore, is not fixed but can be moved (circumferentially of the second contact plate 74) from the outside of the housing 46 so as to take an arbitrarily chosen position between the third and fourth contacts 84 and 86. For example, the movable contact 88 may be provided by utilizing the structural principle of a variable resistor of the rotary type.

Figure 10:
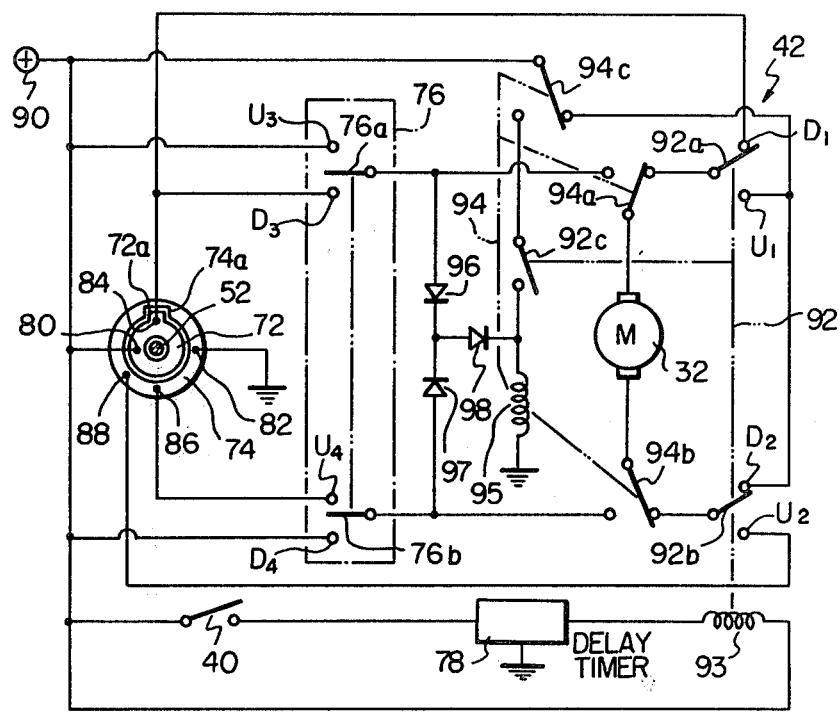
FIG. 10 is a circuit diagram of a control circuit in the system according to the invention.

FIG. 10 shows the construction of the control circuit 42 for the control of the operation of the reversible motor 32. As can be seen, the seat switch 40 and the above described contact plates and contacts in the gear-contact assembly 44 functionally constitute part of the control circuit 42.

The control circuit 42 has a selector switch 76 for switchover of the circuit 42 from automatic operation mode to manual operation mode, and vice versa, a first relay 92 which governs the direction of rotation of the reversible motor 32, a second relay 94 which establishes and breaks a manual operation circuit for the motor 32. Indicated at 90 is the positive terminal of a DC power supply to operate the motor 32 and energize exciting coils 93 and 95 of the two relays 92 and 94. The first relay 92 has three moving contacts 92a, 92b and 92c. The exciting coil 93 of this relay 92 is energized when the seat 10 is occupied so that the seat switch 40 is in the closed state. To prevent unintentional deenergization of the excitation coil 93 by momentary opening of the seat switch 40 resulting from, for example, bouncing of the car, the coil 93 is connected to the seat switch 40 via a delay timer 78 which allows an exciting current to flow through the coil 93 until the lapse of a predetermined length of time after opening of the seat switch 40.

A circuit to energize the excitation coil 95 of the second relay 94 includes two movable contacts 76a and 76b of the selector switch 76 and diodes 96, 97 and 98 to assure a proper direction of an exciting current to the coil 95 irrespective of the connections established by the contacts 76a and 76b. The two sets of contacts respectively comprising the movable contacts 76a and 76b of the selector switch 76 are of the self-returning type and remain in neutral state as shown in FIG. 10 except when manually operated from the outside of the seat 10, and in this state of the selector switch 76 no current flows through the exciting coil 95 of the second relay 94. First and second moving contacts 94a and 94b of the second relay 94 are respectively connected to the two terminals of the reversible motor 32. When the exciting coil 95 is not energized these contacts 94a and 94b connect the motor 32 to the power supply without passing through the selector switch 76. The second relay 94 has another moving contact 94c which is connected to the positive terminal 90 of the power supply, and, when the coil 95 is not energized, constitutes part of the circuit connecting the motor 32 to the power supply. When the coil 95 is energized by the action of the selector switch 76, the contact 94c connects the coil 95 directly to the positive terminal 90 so that the relay 94 is maintained thereafter in the excited state irrespective of the state of the selector switch 76. That is, the second relay 94 is of the self-holding type. The third moving contact 92c of the first relay 92 is arranged to serve as an ON-OFF switch in the self-holding circuit of the second relay 94.

Figure 11:
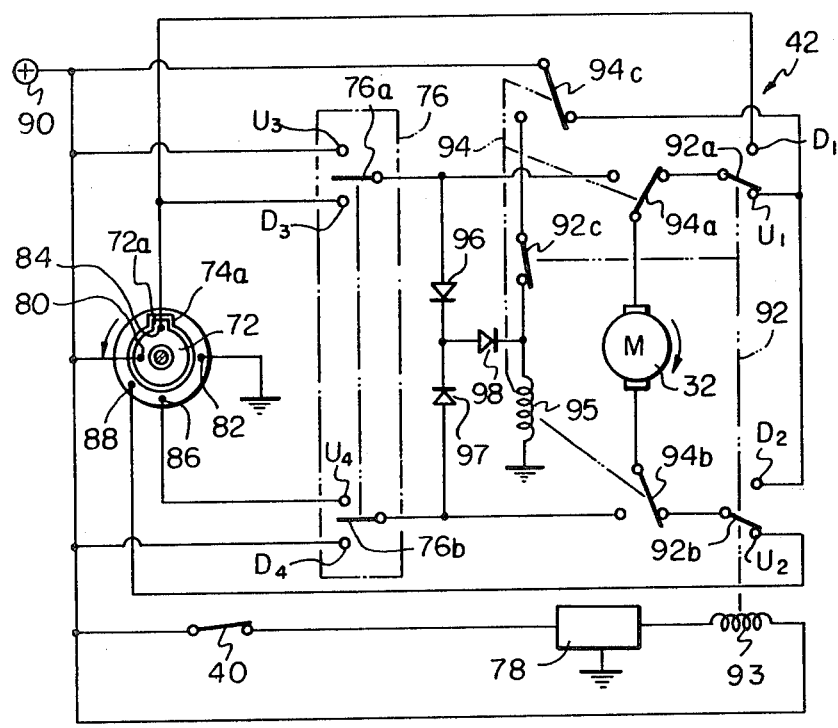
FIGS. 11A to 11E are circuit diagrams showing the circuit of FIG. 10 in variously functioning states.

FIG. 11A shows the function of the control circuit 42 (together with the seat switch 40 and the contact plates 72, 74) during automatic ascent of the head restraint 16 in response to the occupation of the seat 10 by a passenger. The seat switch 40 is closed and the delay timer 78 is actuated so that the exciting coil 93 of the first relay 92 is energized. The selector switch 76 is in neutral state so that the second relay 94 is not energized. Accordingly the moving contacts 94a, 94b and 94c of the second relay 94 are positioned to establish an automatic operation circuit for the motor 32. The first moving contact 92a of the first relay 92 is in contact with an ascent contact $U_1$ which is connected to the positive terminal 90 via the contact 94c of the second relay 94, and the second moving contact 92b of the first relay 92 is in contact with another ascent contact $U_2$ which is grounded via the fifth contact 88 and the second contact 82 in the gear-contact assembly 44. In this state the motor 32 rotates in a direction to cause ascent of the cross bar 20, i.e. ascent of the head restraint 16 from the lowest position A, through the movement of the worm wheel 50, slider 34, connecting rod 36 and the link 24. As the worm wheel 50 is rotated, the contact plates 72 and 74 are rotated anticlockwise on the drawing. However, the motor 32 stops its rotation when the projection 72a of the first contact plate 72 comes into contact with the contact 88, which determines the position C' of the head restraint 16, since the connection of the motor 32 to the grounded second contact plate 74 is broken. This means that the automatic adjustment of the head restraint 16 stops upon arrival of the head restraint 16 at the preset position C'. Thereafter the motor 32 remains at rest and the head restraint 16 remains in the position C' unless the passenger manipulates the selector switch 76 or leaves the seat 10.

Figure 11B:
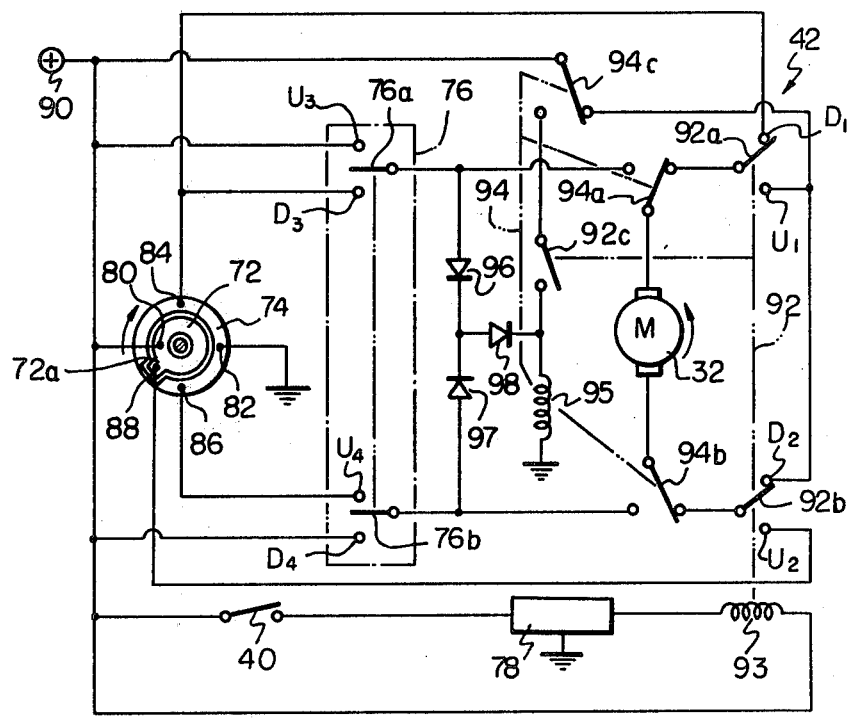

Referring to FIG. 11B, when the passenger leaves the seat 10 the seat switch 40 opens and after a predetermined length of time (for example 5 sec) the delay timer 78 becomes inoperative, making the first relay 92 unexcited. Then the moving contact 92a of the first relay 92 comes into contact with a descent contact $D_1$ which is grounded via the contacts 84 and 82 in the gear-contact assembly 44, and the second moving contact 92b comes into another descent contact $D_2$ which is connected to the positive terminal 90 via the contact 94c of the second relay 94. The selector switch 76 remains in the neutral state and the second relay 94 remains in the unexcited state. Accordingly the motor 32 rotates in the reverse direction to cause automatic descent of the head restraint 16 from the position C'. At the same time the contact plates 72 and 74 are rotated clockwise on the drawing. When the projection 72a of the first contact plate 72 comes into contact with the contact 84, the motor 32 stops its rotation because of the interruption of a current flowing therethrough. The return of the projection 72a to the position of the contact 84 means the arrival of the head restraint 16 at the lowest position A.

Figure 11C:
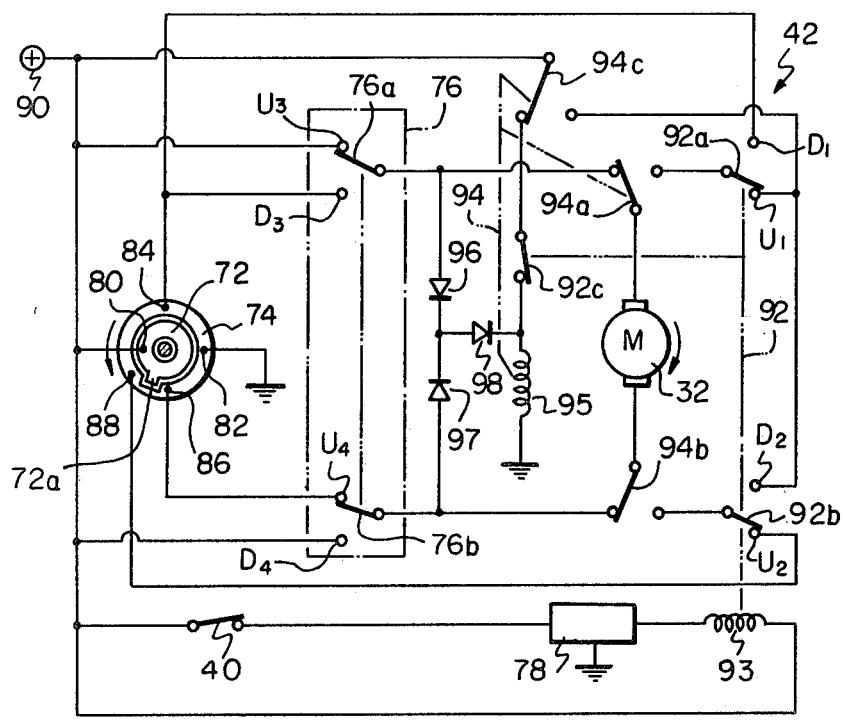

Referring to FIG. 11C, if the passenger in the seat 10 wishes to lift the head restraint 16 from the position C' after completion of the automatic adjustment described with reference to FIG. 11A, the passenger shifts the selector switch 76 to the ascent position. Then the movable contact 76a is brought into contact with an ascent contact $U_3$ which is connected to the positive terminal 90, and the movable contact 76b comes into contact with another ascent contact $U_4$ which is grounded via the contacts 86 and 82 in the gear-contact assembly 44. Then an exciting current is applied to the coil 95 of the second relay 94 through the diodes 96 and 98. As a consequence, the first and second moving contacts 94a and 94b of the second relay 94 connect the motor 32 to the contacts 76a and 76b of the selector switch 76 while the moving contact 94c for self-holding connects the exciting coil 95 to the positive terminal 90. This connection is established since the contact 92c of the first relay 92 remains in the closed state (the first relay 92 is still in the excited state). The motor 32, therefore, begins to rotate in the direction to lift the head restraint 16 and the contact plates 72 and 74 are rotated anticlockwise on the drawing. If the selector switch 76 is kept in this state, the rotation of the motor 32 stops upon arrival of the projection 72a of the first contact plate 72 at the contact 86, meaning the arrival of the head restraint 16 at its highest position B. The head restraint 16 can be adjusted to any position between the position C' and the position B by releasing the selector switch 76 upon arrival of the head restraint at a desired position. Then the selector switch 76 returns to the neutral state, accompanied by the stop of the motor 32.

Figure 11D:
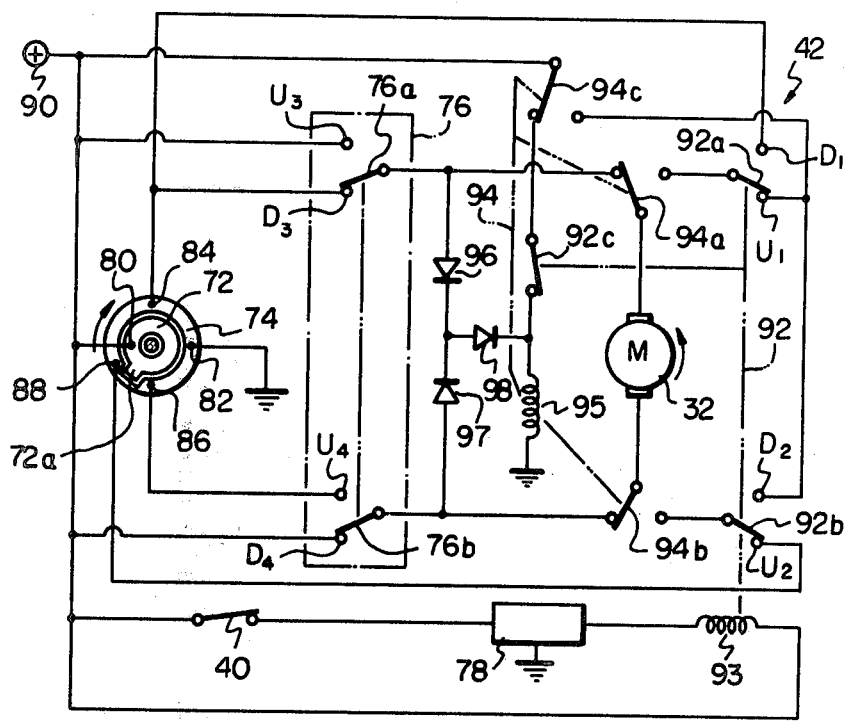
Figure 11E:
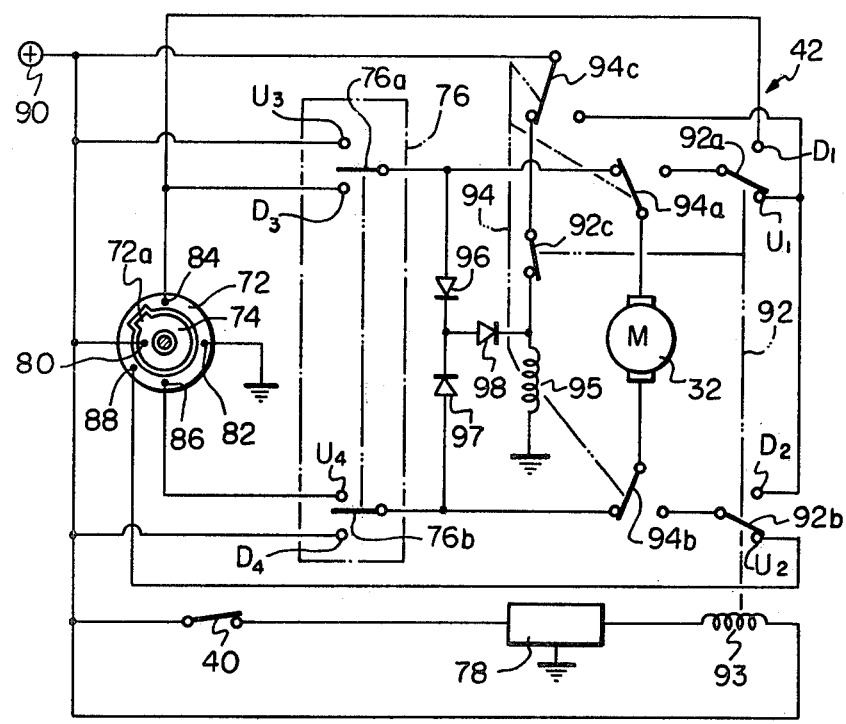

When the passenger in the seat 10 wishes to lower the head restraint 16 from the position C' after completion of the hereinbefore described automatic adjustment, the passenger manipulates the selector switch 76 so as to hold it at the descent position as shown in FIG. 11D. In this case, the movable contact 76a is brought into contact with a descent contact $D_3$ which is grounded via the contacts 84 and 82 in the gear-contact assembly 44, and the movable contact 76b comes into contact with another descent contact $D_4$ which is connected to the positive terminal 90. Accordingly the motor 32 rotates in the reverse direction to lower the head restraint 16 accompanied by clockwise rotation of the contact plates 72 and 74. If the selector switch 76 is kept in this state, the motor 32 continues rotating until the projection 72a of the contact plate 72 comes into contact with the contact 84, meaning the arrival of the head restraint 16 at its lowest position A. However, the rotation of the motor 32 can be stopped when the head restraint 16 is lowered to a desired position between the positions C′ and A simply by releasing the selector switch 76 at that moment. As shown in FIG. 11E, the released selector switch 76 automatically resumes the neutral state while the second relay 94 remains in the excited state, whereby the motor 32 stops its rotation.

The state of FIG. 11E is brought about also when the selector switch 76 is released during manual ascent of the head restraint 16 illustrated in FIG. 11C (though the position of the projection 72a is different).

When the passenger leaves the seat 10 while the circuit 42 is in the state of FIG. 11E, i.e. while the head restraint 16 rests between the preset position C′ and either the highest position B or the lowest position A, the seat switch 40 opens and the delay timer 78 makes the first relay 92 unexcited after the lapse of a predetermined length of time, e.g. 5 sec. Then the contacts 92a, 92b and 92c of the first relay 92 shift to the positions shown in FIG. 11B. This means that the self-holding circuit of the second relay 94 is broken by opening of the contact 92c. As a consequence the contacts 94a and 94b of the second relay 94 also take the positions shown in FIG. 11B so that the motor 32 begins to rotate in the direction to lower the head restraint 16. The rotation of the motor 32, i.e. automatic descent of the head restraint 16, stops when the projection 72a of the contact plate 72 returns to the position of the contact 84.

As will have been understood from the foregoing description of the preferred embodiment, the invention has succeeded in greatly reducing the necessity for manually adjusting the position of the head restraint after automatic ascent of the head restraint. In case of a seat being regularly occupied by a specific person, it is realizable that the head restraint is brought to a position exactly suited for the sitting height of this person solely by automatic ascent of the head restraint. Nevertheless, a system according to the invention permits any passenger to freely raise or lower the head restraint from the position chosen as the target of the automatic adjustment, and such manual adjustment does not influence the result of a succeeding automatic adjustment. Accordingly it is possible to determine the highest position of the head restraint so as to be adequate to a very tall person without taking thought for inconveniences to persons of average height.

Despite distinct advantages over a conventional automatic head restraint adjustment system, a system of the invention can be obtained only by a slight modification of the electrical components of the conventional system. As illustrated in FIGS. 8-10, the electric circuit as the feature of a control system of the invention is relatively simple in construction and can be produced at moderate costs.

What is claimed is:

1. In a system for vertical adjustment of a head restraint on an automotive seat, the system including support members/which support thereon the head restraint and are movable upwards and downwards, a reversible motor, means for transforming rotation of the reversible motor into a linear motion of a rigid bar, means for transmitting a linear motion of the rigid bar to the support members, a load-sensitive switch attached to the seat and a switching circuit for controlling the action of the reversible motor such that the head restraint is lifted from the lowest position thereof in response to the occupation of the seat by a passenger detected by the load-sensitive switch and is lowered in response to the withdrawal of the passenger from the seat, the switching circuit including a manually operated selector switch to enable manual control of the action of the reversible motor so as to move the head restraint from the automatically lifted position while the seat is occupied by a passenger, the improvement comprising a control device in said switching circuit to control the action of said reversible motor such that the head restraint is automatically lifted to an optionally predetermined position in response to the occupation of the seat by a passenger, said control device having a rotatable member formed of an electrically non-conductive material coupled with said reversible motor, a pair of conductors fixed to said rotatable member and a set of contacts stationarily arranged to individually make sliding contact with at least one of said conductors, said set of contacts including a fixed first contact whose angular position with respect to the axis of rotation of said rotatable member determines the lowest position of the head restraint, a fixed second contact whose angular position with respect to said axis of rotation determines the highest position the head restraint can take and a third contact whose angular position with respect to said axis of rotation and said first and second contacts is adjustable from the outside of said switching device and determines said optionally predetermined position of the head restraint.

2. A system as claimed in claim 1, wherein said pair of conductors are two plates of a conducting material arranged substantially in the same plane with a space therebetween, said set of contacts consisting of said first, second, third contacts, a fixed fourth contact which is connected to a positive terminal of the circuit and is positioned so as to be always in contact with one of said two plates and a fixed fifth contact which is grounded and is positioned so as to be always in contact with the other of said two plates, said set of contacts being arranged substantially in a plane parallel to said two plates.

3. A system as claimed in claim 2, wherein said rotatable member is a disc placed concentrically on one side of a toothed wheel which is coupled with said reversible motor, said one of said two plates being a generally annular first plate which is placed concentrically on one side of said disc and has a radial projection, the other of said two plates being a generally annular second plate which has an inner diameter larger than the outer diameter of said first plate and is placed concentrically on said side of said disc, said second plate having a radial indentation on the inner periphery thereof such that said projection of said first plate is received in said indentation without contacting said second plate, said first, second and third contacts being arranged circumferentially such that said projection of said first plate comes into contact with said first, second and third contacts in turn when said toothed wheel is rotated.

4. A system as claimed in claim 3, wherein said first and second contacts are positioned at an angular distance of about 180° from each other, the position of said third contact being adjustable on a substantially semicircular line terminating at said first and second contacts.

5. A system as claimed in any of claims 1 to 4, wherein said switching circuit further comprises a first relay which has an excitation coil connected in series with said load-sensitive switch and two sets of contacts governed by said excitation coil to make switchover of the direction of rotation of said reversible motor.

6. A system as claimed in claim 5, wherein said switching circuit further comprises a second relay which has an excitation coil connected to said selector switch and two sets of contacts governed by said excitation coil of said second relay to selectively establish and break a power circuit for automatic operation of said reversible motor, said selector switch being of the self-return type which can be manually and selectively brought to a first state to rotate said reversible motor in a direction to lower the head restraint and a second state to rotate said reversible motor to the reverse direction but otherwise remains in a neutral state.

7. A system as claimed in claim 6, wherein said second relay is of the self-holding type, said first relay having another set of contacts to selectively establish and break a self-holding circuit for said excitation coil of said second relay, said another set of contacts being governed by said excitation coil of said first relay such that said self-holding circuit is broken in response to the withdrawal of the passenger from the seat detected by said load-sensitive switch, whereby said reversible motor rotates in a direction to lower the head restraint when the passenger leaves the seat after manipulation of said selector switch.

* * * * *